United States Patent
Asano et al.

(10) Patent No.: US 9,619,455 B2
(45) Date of Patent: Apr. 11, 2017

(54) TABLE FORMAT MULTI-DIMENSIONAL DATA TRANSLATION METHOD AND DEVICE

(71) Applicant: HITACHI, LTD., Tokyo (JP)

(72) Inventors: Yu Asano, Tokyo (JP); Makoto Iwayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 331 days.

(21) Appl. No.: 14/445,681

(22) Filed: Jul. 29, 2014

(65) Prior Publication Data

US 2015/0039984 A1    Feb. 5, 2015

(30) Foreign Application Priority Data

Jul. 31, 2013    (JP) ................. 2013-158408

(51) Int. Cl.
| | |
|---|---|
| *G06F 17/00* | (2006.01) |
| *G06F 17/24* | (2006.01) |
| *G06F 17/22* | (2006.01) |
| *G06F 17/30* | (2006.01) |

(52) U.S. Cl.
CPC ........ *G06F 17/246* (2013.01); *G06F 17/2264* (2013.01); *G06F 17/30569* (2013.01)

(58) Field of Classification Search
None
See application file for complete search history.

(56) References Cited

U.S. PATENT DOCUMENTS

| 8,037,108 B1 * | 10/2011 | Chang | ................. G06F 17/303 707/803 |
| 2007/0198541 A1 * | 8/2007 | Betz | ................. G06F 17/30917 |
| 2009/0138498 A1 * | 5/2009 | Krishnamoorthy | G06F 17/30427 |
| 2010/0036862 A1 * | 2/2010 | Das | ................. G06F 17/30917 707/698 |
| 2012/0303668 A1 * | 11/2012 | Srinivasan | ........ G06F 17/30292 707/792 |

* cited by examiner

*Primary Examiner* — Scott Baderman
*Assistant Examiner* — Howard Cortes
(74) *Attorney, Agent, or Firm* — Volpe and Koenig, P.C.

(57) ABSTRACT

The invention includes a first process of inserting one row below each row of a column heading of an original table, inserting one column to the right of each column of a row heading, and entering a corresponding ID into each cell of the inserted row or column; a second process of inserting one row between the column heading and data portion, inserting one column between the row heading and data portion, and entering an ID of the dimension when inserted cells indicate a value of a dimension, entering no data when inserted cells indicate a measure, and entering an ID of a measure into a cell at the intersection of the inserted row and column when column headings and row headings indicate dimension's values; and a third process of identifying a dimension, value thereof, or measure corresponding to each cell of the data portion of the created template table.

13 Claims, 18 Drawing Sheets

FIG. 1

|  | Shipment value of products | Number of employees |
|---|---|---|
| Hokkaido | 6182 | 5913 |
| Aomori | 2313 | 1932 |

FIG. 2

|  | Shipment value of products | Number of employees |
|---|---|---|
| Hokkaido | 6182 — Cell 1 | 5913 — Cell 2 |
| Aomori | 2313 — Cell 3 | 1932 — Cell 4 | qb:measureType ex:vStocks ex:pref

FIG. 5

```
URI of cell 1
    ...
    ex:pref pref:C00 ;
    qb:measureType ex:vStocks ;
    ex:vStocks 6182 .
URI of cell 2
    ...
    ex:pref pref:C01 ;
    qb:measureType ex:nEmployees ;
    ex:nEmployees 5913 .
URI of cell 3
    ...
URI of cell 4
    ...
```

FIG. 6

| | | | Shipment value of products | Number of employees |
|---|---|---|---|---|
| | 607 | 608 | ex:vStocks | ex:nEmployees |
| | ex:pref | | | |
| Hokkaido | pref:C00 | | 6182 | 5913 |
| Aomori | pref:C01 | | 2313 | 1932 |

| | | Shipment value of products | | Number of employees | |
|---|---|---|---|---|---|
| | | Measure URI | | Measure URI | |
| | | 2010 | 2011 | 2010 | 2011 |
| Dimension URI | Dimension URI | Dimension's value URI | Dimension's value URI | Dimension's value URI | Dimension's value URI |
| Hokkaido | Sapporo-city | ... | ... | ... | ... |
| | Hakodate-city | ... | ... | ... | ... |

Labels: 1001, 1002, 1003, 1004, 1010, 1012, 1013, 1011, 1009, 1008, 1007, 1006, 1005

FIG. 14

| | | | | Shipment value of products | | | | Number of employees | | | |
|---|---|---|---|---|---|---|---|---|---|---|---|
| | | | | Measure URI | | | | Measure URI | | | |
| | | | | 2010 | | 2011 | | 2010 | | 2011 | |
| | | | Dimension URI | Dimension's value URI | | Dimension's value URI | | Dimension's value URI | | Dimension's value URI | |
| | Dimension URI | | Dimension URI | | | | | | | | |
| Hokkaido | Dimension's value URI | Sapporo-city | Dimension's value URI | | | ... | | ... | | ... | |
| | | Hakodate-city | Dimension's value URI | | | ... | | ... | | ... | |

FIG. 15

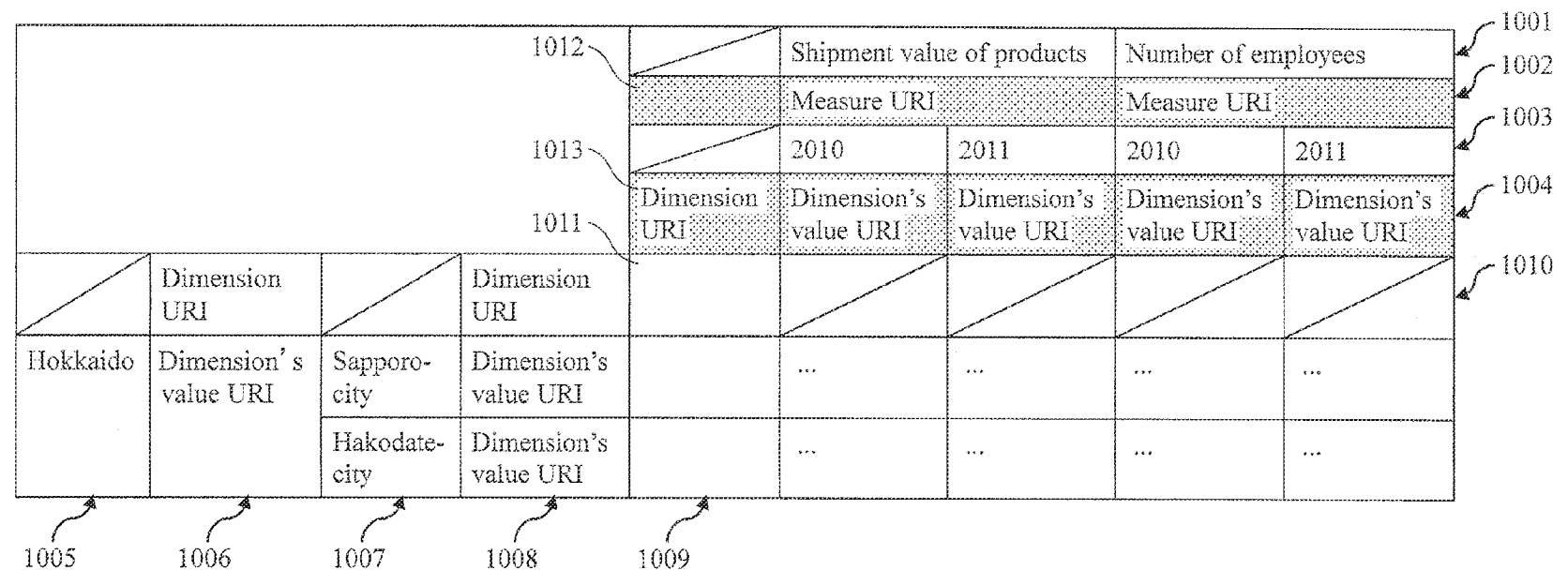

| | | | 1001↓ 1002↓ 1003↓ 1004↓ | | 1010↓ | | |
|---|---|---|---|---|---|---|---|
| | | | Shipment value of products | | Number of employees | | |
| | | | Measure URI | | Measure URI | | |
| | | | 2010 | 2011 | 2010 | 2011 | |
| | | Dimension URI | Dimension's value URI | Dimension's value URI | Dimension's value URI | Dimension's value URI | ... |
| | | | | | | | ... |
| | Dimension URI | | | | | | |
| | Dimension's value URI | Sapporo-city | | | | | |
| | Dimension's value URI | Hakodate-city | | | | | |
| Hokkaido | | | | | | | |

|  |  |  |  | PA[1] | PA[2] |
|---|---|---|---|---|---|
|  |  |  |  | Shipment value of products | Number of employees |
| PVU[1] | Hokkaido | Sapporo-city | 2010 | S[2] | S[6] |
| PVU[2] | Hokkaido | Sapporo-city | 2011 | S[5] | S[1] |
| PVU[3] | Hokkaido | Hakodate-city | 2010 | S[7] | S[3] |
| PVU[4] | Hokkaido | Hakodate-city | 2011 | S[4] | S[8] |

FIG. 23

| Subject | Predicate | Object |
|---|---|---|
| S[1] | Prefecture | Hokkaido |
| S[1] | Number of employees | ... |
| S[1] | City | Sapporo-city |
| S[1] | Year | 2011 |
| ... | ... | ... |

2301

TABLE FORMAT MULTI-DIMENSIONAL DATA TRANSLATION METHOD AND DEVICE

CLAIM OF PRIORITY

The present application claims priority from Japanese patent application JP 2013-158408 filed on Jul. 31, 2013, the content of which is hereby incorporated by reference into this application.

BACKGROUND

Technical Field

The present invention relates to a method and device for importing table format multi-dimensional data and translating the data into a format that can be easily processed by a computer.

Background Art

Nowadays, there is an increasing need for the following processes to be performed.
(1) A process of filtering multi-dimensional data, such as statistical data represented in a table format, from a variety of perspectives, and accumulating the resultant data.
(2) A process of integrating pieces of multi-dimensional data, which are represented in different table formats, into a single piece of multi-dimensional data.

However, multi-dimensional data represented in a table format is usually not suitable for computer processing. Thus, in recent years, multi-dimensional data has been attempted to be represented in a format called RDF (Resource Description Framework) so as to be adapted to the aforementioned computer processing. For example, when tabular data represented by three rows×three columns as shown in FIG. 1 or 2 is represented in the RDF format, it will be schematically represented in a network format as shown in FIG. 3. FIG. 3 represents "cell 1," which is contained in the data portion (i.e., 2 rows×2 columns of cells) of the table shown in FIGS. 1 and 2, in the RDF format. Data in each cell is described with dimension information and measure information for uniquely identifying the cell. When such a description method is adopted, even if the same cell is described in different table formats, the cell will be represented the same in the RDF format, whereby it becomes easier to perform a filtering process, an integration process, or the like with a computer.

As described above, although table formats are usually not suitable for computer processing, they are easy to handle by humans. Meanwhile, when thousands of pieces of multi-dimensional data are represented in the RDF format, problems would arise that humans would not be able to easily recognize the relationship among the pieces of data and that the RDF format lacks a data listing property. In addition, another problem would arise that with the RDF format, it would be difficult for humans to find out the intended data and further edit the data. Further, while a table format allows elements of row headings or column headings (e.g., "shipment value of products" in FIG. 2) to be changed at once, if the same process is to be executed on data in the RDF format, it would be necessary to change all pieces of information on the corresponding nodes and links (e.g., the node of "ex:vStocks" and the link thereof in the case of FIG. 3) for individual cells.

SUMMARY

Therefore, it is desired that a single piece of multi-dimensional data be able to be mutually translated between a two-dimensional table format that is easy to handle by humans and the RFD format that is easy to handle by computers. However, when a process of translating data in a table format into data in the RDF format is executed with a computer, it is often the case that the table format lacks information that is necessary for computer processing. Hereinafter, description will be made with reference to a specific example.

First, information that is necessary to process multi-dimensional data with a computer will be described. Constituent data (i.e., cells) of a table represent observed values that have been measured from a plurality of perspectives. For example, constituent data (i.e., cell) denoted by reference numeral 105 in FIG. 1 represents the shipment value of products corresponding to "prefecture" called "Hokkaido." In the absence of the perspective "Hokkaido" that is the element of "Prefecture," the constituent data (i.e., cell) will have no meaning. Hereinafter, "Prefecture" will be referred to as a dimension, and "Hokkaido" will be referred to as the value of the dimension. Although FIG. 1 describes only "Hokkaido" that represents the value of a dimension, humans would be able to easily predict that "Hokkaido" represents the value of the dimension: "Prefecture" by seeing the whole table. However, as there is also a possibility that "Hokkaido" may represent the value of another dimension such as "industrial area," the dimension should be explicitly stated in order to perform computer processing.

In addition, the "shipment value of products" in a column heading, which is denoted by reference numeral 101, represents not a dimension that determines an observed value, but represents a measurement target regarding an observed value. Such information will be referred to as a measure. Herein, although humans are able to understand that the "shipment value of products" represents a "measure," it would be necessary to clearly distinguish between the "measure" and the "dimension" in order to perform computer processing. The description "measure" is often omitted in tables for humans as described below.

Meanwhile, even when computer processing is to be performed, if character strings of dimensions, the values of the dimensions, and measures, such as "prefecture," "Hokkaido," and "shipment value of products," are provided with unique IDs such as URIs (Uniform Resource Identifier), it becomes possible to integrate pieces of data using identical IDs. However, as such IDs are not needed for tables for humans, the table shown in FIG. 1 does not explicitly state such IDs.

In conclusion, the following features have been confirmed.
(1) In tables for humans, dimensions and measures are omitted in some cases.
(2) In tables for humans, dimensions and measures are not distinguished from each other in many cases.
(3) In tables for humans, IDs of dimensions, the values of the dimensions, or measures are not explicitly stated, either.

Therefore, in order to execute a process of translating data in a table format into data in the RDF format with a computer, it would be necessary to describe missing information in the table for humans prior to performing the translation process. The inventors consider that if it is possible to naturally embed information that is necessary for a translation process while preserving the structure of the table for humans as much as possible, it becomes possible to translate the data in the table format into data in the RDF format that can be processed by a computer while maintaining the advantages of the table format that is easy to handle by humans.

In order to solve the above problems, the inventors adopt the features recited in the appended claims, for example. The present application contains a plurality of means for solving the above problems. One example thereof is a table format multi-dimensional data translation device (or method) that includes (1) a first processing unit (or a first process) of inserting one row below each row of a column heading portion of an original table and entering an ID of a corresponding column heading into each cell of the inserted row, and inserting a column to the right of each column of a row heading portion of the original table and entering an ID of a corresponding row heading into each cell of the inserted column; (2) a second processing unit (or process) of inserting one row between the column heading portion and a data portion, inserting one column between the row heading portion and the data portion, and entering, if a row of the column heading portion or a column of the row heading portion indicates a value of a dimension, an ID of the dimension into the corresponding cell of inserted column or row, and entering, if all of column headings and row headings indicate dimensions, an ID of a measure into a cell at an intersection of the inserted row and column; and (3) a third processing unit (or process) of, from each cell of a data portion of a template table (i.e., intermediate table) created by the first and second processing units (or processes) (the order of execution is not questioned), identifying a dimension, a value of the dimension, and a measure entered in the column heading or the row heading corresponding to each cell, and outputting the information as data in a RDF format.

According to the present invention, a template table (i.e., an intermediate table) is created by embedding into an original table, which has been entered, information that is necessary to translate the original table into data in the RDF format without making any changes to a data portion of the original table. Further, information that is necessary to create data in the RDF format is identified from the created template table (i.e., intermediate table). According to the present invention, it is possible to, by adopting such a processing method, translate a data portion of an original table, which has been entered, into data in the RDF format that can be processed by a computer while maintaining the advantages of the table format that can be easily handled by humans. Other problems, configurations, and advantageous effects will become apparent from the following description of embodiments.

BRIEF DESCRIPTION OF THE DRAWINGS

FIG. 1 is a diagram showing an example of tabular data.

FIG. 2 is a diagram illustrating association between cell data that constitutes tabular data and information that is necessary to describe data in the RDF format.

FIG. 5 is a diagram showing an example of text representation of RDF data.

FIG. 6 is a diagram showing an example of a template table having embedded therein information that is necessary to create RDF.

FIG. 10 is a diagram showing an example of a template table generated from tabular data of a plurality of measures.

FIG. 14 is a diagram showing an exemplary screen in which the location of the intersection of a template row and a template column is highlighted.

FIG. 15 is a diagram showing an exemplary screen in which a URI row, which has been inserted immediately below each row of column headings, is highlighted.

FIG. 22 is a diagram showing an example of tabular data translated from RDF data.

FIG. 23 is a diagram showing an example of triples of RDF data.

DETAILED DESCRIPTION OF THE EMBODIMENT(S)

Hereinafter, embodiments of the present invention will be described with reference to the drawings. It should be noted that the embodiments of the present invention are not limited to those described below, and various variations are possible within the spirit and scope of the invention.

Embodiment 1

(1) Device Configuration

Figure 4:
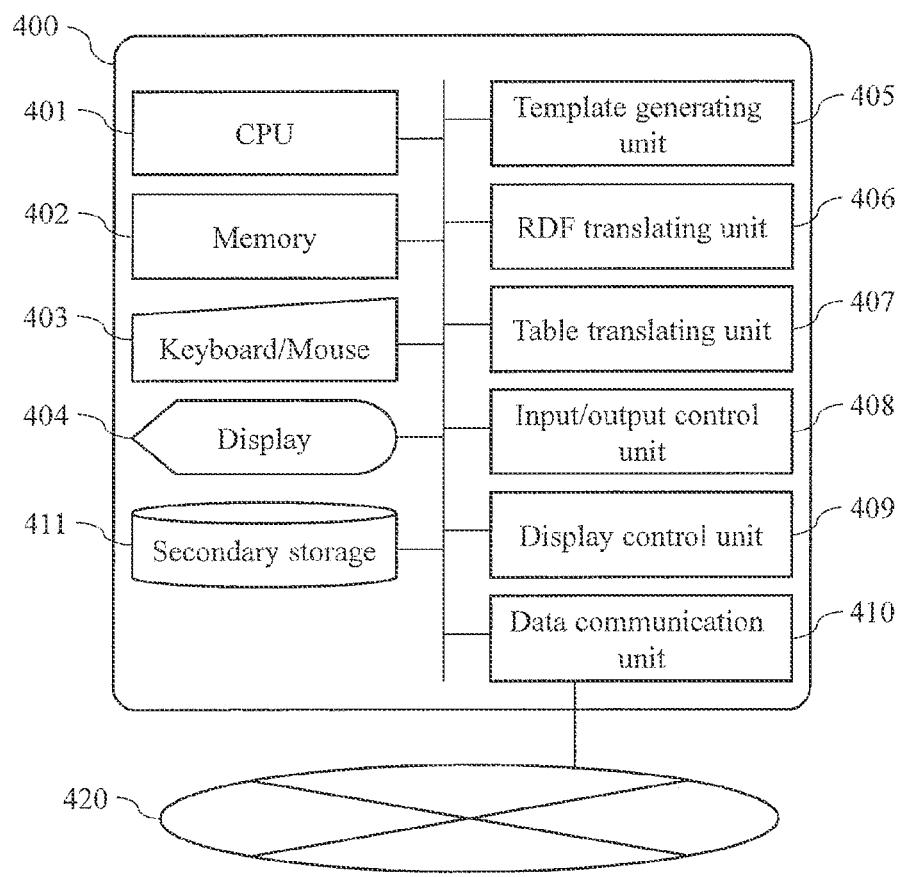
FIG. 4 is a block diagram showing an exemplary configuration of a table format multi-dimensional data translation device.

FIG. 4 shows the configuration of a table format multi-dimensional data translation device in accordance with this embodiment. A table format multi-dimensional data translation device 400 includes a CPU 401, a memory 402, a keyboard/mouse 403, a display 404, a template generating unit 405, a RDF translating unit 406, a table translating unit 407, an input/output control unit 408, a display control unit 409, a data communication unit 410, and a secondary storage 411.

The CPU 401 executes a variety of processing by executing a variety of programs that constitute the template generating unit 405, the RDF translating unit 406, the table translating unit 407, the input/output control unit 408, and the display control unit 409. The memory 402 temporarily stores a program executed by the CPU 401 and data that is necessary to execute the program. The keyboard/mouse 403 receives an input from a user. The display 404 displays an editing screen (e.g., an editing screen 1100 in FIG. 11 or an editing screen 1200 in FIG. 12) under the control of the display control unit 409. The secondary storage 411 includes, for example, a hard disk for permanently storing input data, output data, and the like.

The template generating unit 405 is formed by a program for inserting rows or columns into tabular data to generate a template table (i.e., intermediate table) having described therein information that is necessary to create RDF (hereinafter also referred to as "information for creating RDF"). The RDF translating unit 406 is formed by a program for translating data represented by each cell of a data portion of tabular data into data in the RDF format using the template table (i.e., intermediate table) that has the necessary information described therein. The table translating unit 407 is formed by a program for translating data in the RDF format into data in a table format. The input/output control unit 408 controls input/output of data in the table format or the RDF format. The display control unit 409 is formed by a program for displaying an editing screen. The data communication unit 410 is an interface for communicating data via a network 420, and includes a LAN card that can perform communication using the TCP/IP protocol, for example.

(2) Configuration of the Template Table

Before describing the details of a program that forms each unit, a template table (i.e., intermediate table) generated by the template generating unit 405 will be described. In the following description, the table shown in FIGS. 1 and 2 is used as an original table, and a template table (i.e., intermediate table) is generated from the original table. Then, after necessary information is entered into the generated template table, data in each cell of the data portion is translated into data in the RDF format by the RDF translating unit 406 described below.

Figure 3:
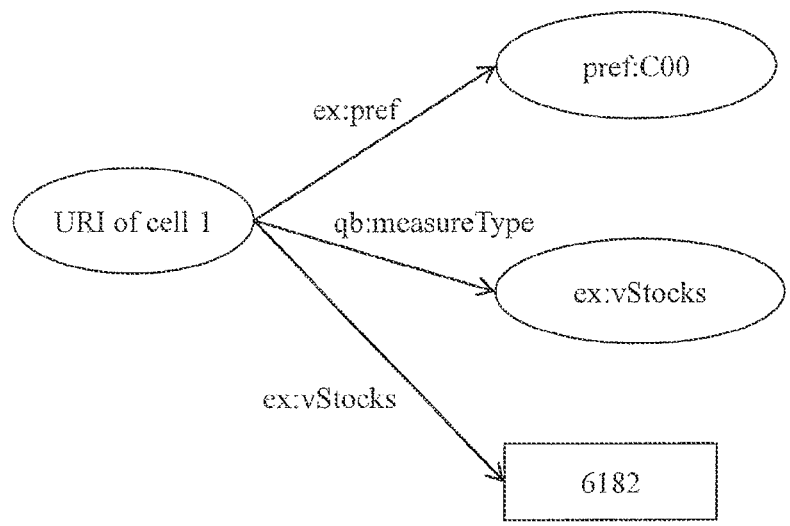
FIG. 3 is a diagram showing a schematic example of RDF data.

As described above, FIG. 3 schematically shows the cell 1 in FIG. 2 in the RDF format. In practice, data in the RDF format is output in a text format such as the one shown in FIG. 5. As described above, when a table is translated into RDF, information on a dimension, which represents a perspective of observation, the value of the dimension, and a measure, which represents an observation target, is described in a format such as the one shown in FIG. 3 for each cell of the data portion of the table that contains the observed values. FIG. 3 represents that the value of the dimension: prefecture "ex:pref" of the cell 1 is Hokkaido as denoted by "pref:C00," the measure: "qb:measureType" of the cell 1 is the shipment value of products as denoted by "ex:vStocks," and the shipment value of products: "ex:vStocks" of the cell 1 is "6182." Herein, "ex:pref" or the like represents a unique ID called URI.

FIG. 2 shows which cell of the original table corresponds to information on the cell 1 represented in the RDF format. The original table does not contain the prefecture "ex:pref." Although the original table contains information including "Hokkaido" that represents the value of a dimension and the "shipment value of products" that represents a measure, it does not contain information to the effect that the former represents the value of a dimension and the latter represents a measure. Further, the original table does not contain the URI of such information, either.

Thus, rows and columns are inserted into the table in FIGS. 1 and 2 to allow the above information to be described therein, whereby a template table (i.e., intermediate table) such as the one shown in FIG. 6 is generated. The details of a process of generating such template table (i.e., intermediate table) will be described later.

First, the template generating unit 405 inserts one row (i.e., row 602) below a row 601 of column headings to allow URIs of corresponding measures to be described in the row. Likewise, the template generating unit 405 inserts one column (i.e., column 604) to the right of a column 603 of row headings to allow URIs of corresponding values of a dimension to be described therein. In the example of FIG. 6, URIs of corresponding measures and URIs of corresponding values of a dimension are already described. It should be noted that it is also possible to insert one row above the row 601 of column headings and insert one column to the left of the column 603 of row headings, unlike in FIG. 6.

Next, the template generating unit 405 also inserts one row (i.e., row 605) between the column heading portion (i.e., the row 601 and the row 602 in FIG. 6) and the data portion, and also inserts one column (i.e., column 606) between the row heading portion (i.e., the column 603 and the column 604 in FIG. 6) and the data portion. Although the example herein shows a case in which the row 605 and the column 606 are inserted after the row 602 and the column 604 are inserted, the order of insertion is not limited thereto, and it is also possible to insert the row 602 and the column 604 after inserting the row 605 and the column 606.

As shown in FIG. 6, cells that are marked with diagonal lines among the cells in the row 605 and the column 606, which have been inserted so as to separate the heading portions (i.e., the row heading portion and the column heading portion) and the data portion, are unused cells. Cells without diagonal lines are used to enter information on a dimension or measure. For example, as the values of the dimension "prefecture" are inserted into the column 604 including a cell 607, the URI of the dimension corresponding to the prefecture is entered into the cell 607. Meanwhile, as a column heading that corresponds to each cell of a row including a cell 608 represents a measure, the cell 608 is left empty.

By adopting such insertion rule, the template generating unit 405 can determine, by checking if a cell is empty or not, whether a row heading or a column heading corresponding to the cell represents a dimension or a measure. Accordingly, all pieces of information for creating RDF can be embedded in the table. The information herein is manually inserted by a user, for example. When the template table (i.e., intermediate table) shown in FIG. 6 is complete, the program can automatically generate data in the RDF format from data of the data portion.

Herein, all rows and columns that are automatically inserted into the original table in generating a template table (i.e., intermediate table) are limited to column heading portions and row heading portions. That is, as the data portion is not changed at all, the basic structure of the original table is preserved. Accordingly, it is possible to reproduce the original table from the template table (i.e., intermediate table) any time by hiding the inserted rows and columns. That is, a user is able to view or edit data on the original table. A process of translating a template table (i.e., intermediate table) into an original table will be described with reference to FIG. 17, and a process of editing data (i.e., process of inserting or deleting rows/columns) will be described with reference to FIGS. 18 and 19.

In the template table (i.e., intermediate table) proposed in this embodiment, it is possible to not only enter a URI at a position immediately below (or above) each element of a column heading of the original table (i.e., two-dimensional table) but also enter a URI to the immediate right (or left) of a row heading. Therefore, a user is able to promptly find out missing URIs or erroneous entry of URIs. In addition, in the case of such template table (i.e., intermediate table), a user is able to view the values of a dimension, measures, and URIs, which are collectively described in the column heading portion and the row heading portion, at once. Thus, the consistency of representation of URIs is easy to maintain.

Figures 7, 8:
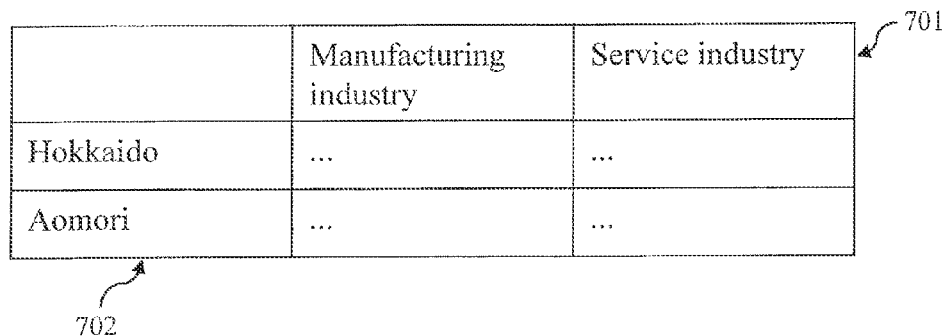
FIG. 7 is a diagram showing an example of tabular data of a single measure.
FIG. 8 is a diagram showing an example of a template table generated from tabular data of a single measure.
Figure 9:
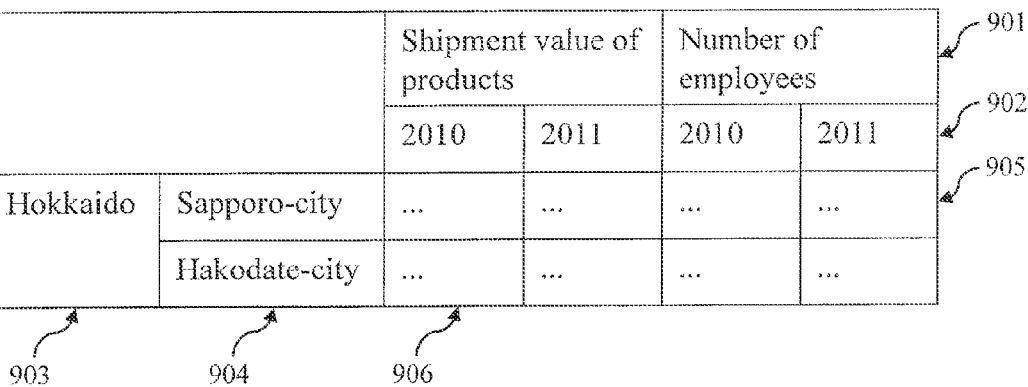
FIG. 9 is a diagram showing an example of tabular data of a plurality of measures.

Hereinafter, how a template table to be generated would differ depending on whether the original table contains a single measure or a plurality of measures will be described with reference to FIGS. 7 to 10. FIG. 7 shows an example of tabular data for a case where the original table contains a single measure. FIG. 9 shows an example of tabular data for a case where the original table contains a plurality of measures. FIG. 8 shows an example of a template table generated from tabular data of a single measure, and FIG. 10 shows an example of a template table generated from tabular data of a plurality of measures. Hereinafter, a case where the original table contains a single measure and a case where the original table contains a plurality of measures will be sequentially described to illustrate that the template table (i.e., intermediate table) shown in FIG. 6 is compatible with a variety of table formats.

FIG. 7 shows an example in which each of column headings and row headings of an original table is given by a dimension. A row 701 of column headings is given by the dimension "Industrial Classification," and a column 702 of row headings is given by the dimension "Prefecture." A measure is common to all pieces of data, and "sales amount" is set as the measure, for example. However, information on the measure is often not described in the original table but is described in the title of the table or the like in many cases. A table in such a format is referred to as a table of a single measure.

FIG. 8 shows an example of a template table generated from the original table shown in FIG. 7. The template table is generated in the same procedures as those for generating the table in FIG. 6. However, in the case of the table of a single measure shown in FIG. 7, both the row 701 of column headings and the column 702 of row headings are given by dimensions. Therefore, a dimension URI is entered into a cell 802 located at the intersection of a row 803, which has been inserted below the row of column headings, and a column 805, which has been inserted between the row heading portion and the data portion (which is different from FIG. 6). Therefore, the URI of a measure of each cell of the data portion is entered into the cell 801 located at the intersection of the row 804 inserted between the row heading portion and the data portion and the column 805.

FIG. 9 shows an example of a complex table in which each of a column heading portion and a row heading portion contains a plurality of rows and columns. In the original table shown in FIG. 9, each of columns 903 and 904 of row headings and a row 902 of column headings represents dimensions, while a row 901 of column headings represents measures. FIG. 10 shows an example of a template table generated from the original table of a plurality of measures shown in FIG. 9. In the case of the template table herein, a dimension URI is written into a cell 1013 at the intersection of a row 1004, which has been inserted below a second row 1003 of column headings, and a column 1009, which has been inserted between the row heading portion and the data portion. It should be noted that a cell 1012 at the intersection of a row 1002, which has been inserted below a first row 1001 of column headings, and the column 1009, which has been inserted between the row heading portion and the data portion, is empty since all of the elements in the corresponding row of column headings correspond to measures. It should be noted that as measure URIs are written into corresponding cells in the row 1002, a cell 1011 located at the intersection of a row 1010, which has been inserted between the heading portion and the data portion, and the column 1009 remains empty (which is different from FIG. 8).

As described above, the template table proposed in this embodiment is compatible with a case where heading portions (i.e., a row of column headings and a column of row headings) have (1) a combination of headings including "dimensions (values of a dimension)" and headings including "measures," (2) a combination of headings including "dimensions (values of a dimension)," (3) a combination of composite headings including "dimensions (values of a dimension) and measures" and headings including "dimensions (values of a dimension), or the like.

(3) Editing Screen

Figure 11:
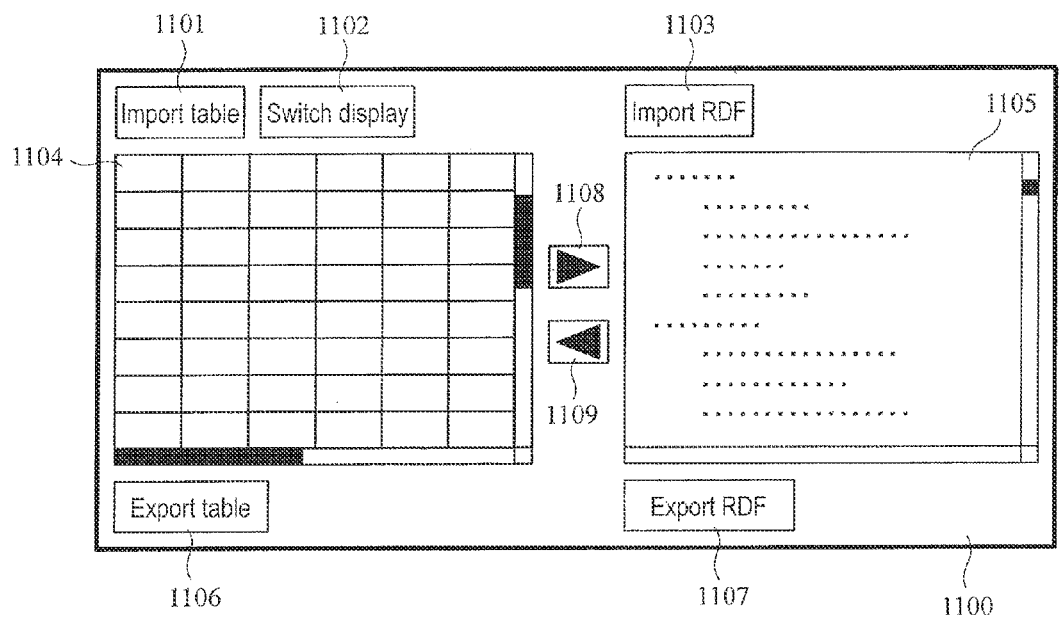
FIG. 11 is a diagram showing an exemplary editing screen 1 for tabular data and RDF data.

FIG. 11 shows an example of an editing screen used by the table format multi-dimensional data translation device 400. An editing screen 1100 is used in not only a case where data in the RDF format is generated from data in a table format but also a case where data in a table format is generated from data in the RDF format. A display area for the table format and a display area for the RDF format, which correspond to the same data, are displayed side by side. A user is able to mutually translate the two pieces of data into each other on the editing screen 1100. In addition, each individual display area can be used to individually edit corresponding data.

The display area 1104 is an area for displaying data in a table format, while the display area 1105 is an area for displaying data in the RDF format. The display area 1104 selectively displays not only an original table or a table created from data in the RDF format but also a template table. The display area 1105 displays the RDF-format data in a text format as shown in FIG. 5. With the editing screen 1100, a user is able to easily understand the content of the whole data and easily check the link relationship of each cell.

When a table import button 1101 is clicked on the screen, the display control unit 409 displays a file selection screen on the editing screen 1100. It should be noted that when a touch screen for entering information is provided on the surface of the screen of the display 404, the mouse-click operation is replaced with a touch operation. Tabular data that is a selection target is imported from the secondary storage 411 or an external storage via the network 420. The display control unit 409 displays a template table (i.e., intermediate table) generated from the imported tabular data on the display area 1104. In addition, the display control unit 409, when a template table is displayed in the display area 1104, displays information (e.g., dimension URIs, dimension's value URIs, and measure URIs) that is necessary to create RDF from the original table such that the information fills the corresponding cells.

A display switch button 1102 is used to switch the format of a table displayed on the display area 1104. For example, when the display switch button 1102 is clicked while a template table is displayed in the display area 1104, the display control unit 409 hides the rows and columns that have been inserted in generating the template table, thereby restoring the display content to the original table. Meanwhile, when the display switch button 1102 is clicked while the original table is displayed, the display control unit 409 displays the rows and columns, which have been hidden, again. That is, in this embodiment, the display switch button 1102 functions as a toggle switch for switching between a state in which the inserted rows and columns are displayed and a state in which the inserted rows and columns are not displayed.

By operating the display switch button 1102 in accordance with an intended purpose, a user is able to perform a desired operation by switching the display state of the display area 1104. For example, when information for creating RDF is entered, the display area 1104 is caused to display the inserted rows and columns (i.e., display a template table). When entry of the information for creating RDF is complete, the user hides the inserted rows and columns to concentrate on viewing or editing data in the same display state as that in the original table.

When a table export button 1106 is clicked on the screen, the table format multi-dimensional data translation device 400 stores the table displayed in the display area 1104 into the secondary storage 411, or an external storage connected via the network 420.

A translation button 1108 is clicked to translate data in the table format displayed in the display area 1104 into data in the RDF format. When the button is clicked, data in the RDF format, which is generated from data in the table format displayed in the display area 1104, is displayed in the display area 1105. With such a function, a user is able to easily generate RDF data that can be processed by a computer.

Besides, a RDF import button 1103 is used to import data in the RDF format from the secondary storage 411 or an external storage connected via the network 420 and display the data in the display area 1105.

When a RDF export button 1107 is clicked on the screen, the input/output control unit 408 stores the data in the RDF format, which is displayed in the display area 1105, into the secondary storage 411 or an external storage connected via the network 420.

The translation button 1109 is clicked to translate data in the RDF format, which is displayed in the display area 1105, into data in the table format. When the button is clicked, data in the table format, which is generated from data in the RDF format displayed in the display area 1105, is displayed in the display area 1104. With such a function, a user is able to easily check the content of the table corresponding to the RDF data.

Figure 12:
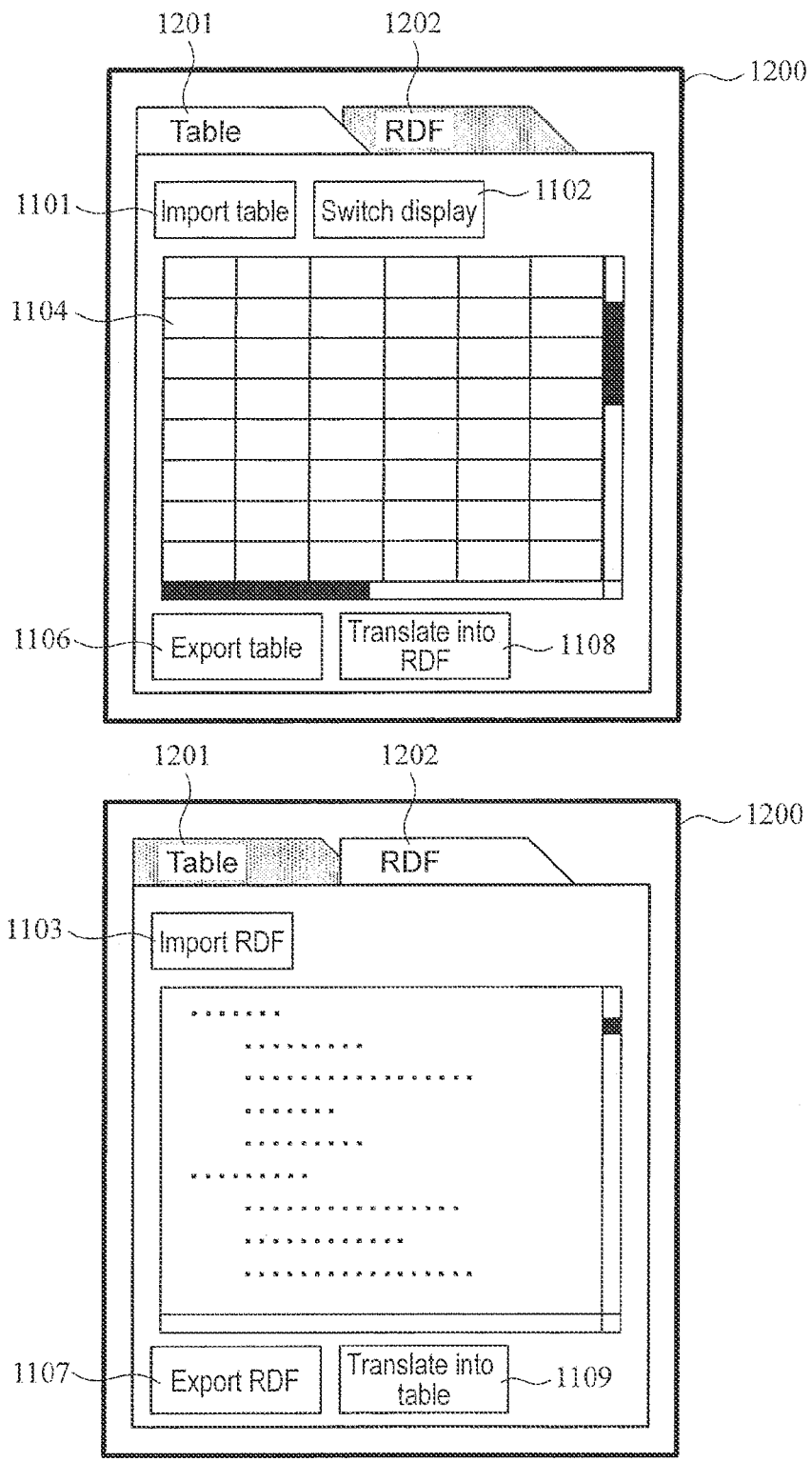
FIG. 12 is a diagram showing an exemplary editing screen 2 for tabular data and RDF data.

FIG. 12 shows another exemplary editing screen. An editing screen 1200 exclusively displays one of data in the table format or data in the RDF format on the screen by switching between them. For switching the display format, tabs 1201 and 1202 are used. The tab 1201 is clicked to display data in the table format on the screen. This corresponds to a screen of the upper diagram of FIG. 12. The tab 1202 is clicked to display data in the RDF format on the screen. This corresponds to a screen of the lower diagram of FIG. 12. It should be noted that in FIG. 12, portions that correspond to those in FIG. 11 are denoted by the same reference numerals. When such a display format is adopted, the limited display size of the display 404 can be effectively used. That is, such a display format allows a user to easily check the table.

(4) Exemplary Processing Operation

Hereinafter, an exemplary processing operation that is implemented via a program executed by the CPU 401 will be described.

(4-1) Process of Generating Template Table from Tabular Data

Figure 13:
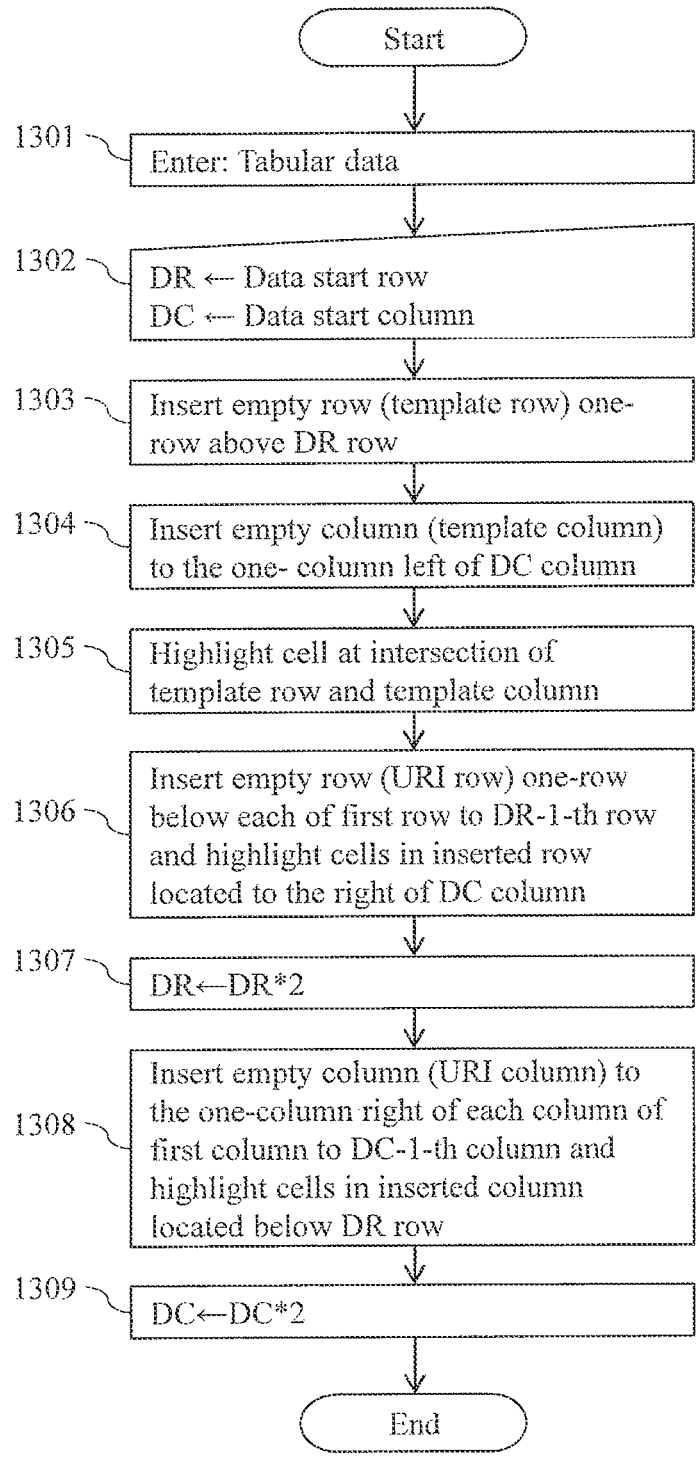
FIG. 13 is a flowchart describing a process of generating a template table from tabular data.

First, a process that is executed when a user clicks the table import button 1101 will be described. That is, a process of generating a template table from the imported table will be described. FIG. 13 shows processing procedures for generating a template. It should be noted that the CPU 401 and the template generating unit 405 cooperatively execute the process shown in FIG. 13 in accordance with a program.
(Step 1301)

The CPU 401, upon detecting a click operation on the table import button 1101, imports tabular data selected on the file selection screen into the memory 402, and displays the imported tabular data on the editing screen 1100 or the editing screen 1200.
(Step 1302)

When the original table is displayed in the display area 1104, upon input of the start row and the start column of the data portion from a user, the template generating unit 405 stores the start row number and the start column number as variables DR and DC. In the case of the table shown in FIG. 9, the data start row DR is the third row, and the data start column DC is the third column. Needless to say, it is also possible to adopt a method of causing the template generating unit 405 to automatically estimate the data portion from uniformity of the format of data (e.g., date and time format). Alternatively, it is also possible to adopt a method of displaying an automatically estimated value on the screen and receiving modification from a user as needed.
(Steps 1303 to 1304)

Upon determination of the variables DR and DC in the previous step, the template generating unit 405 inserts one row above the data portion and also inserts one column to the left of the data portion so as to prepare a row and a column for entering information on dimensions and measures. Specifically, an empty row is inserted one row above the DR row, and an empty column is inserted one column left to the DC column. In this specification, a row and a column that are inserted between the data portion and the heading portions (which are portions other than the data portion and include row headings and column headings) are referred to as a template row and a template column, respectively. For example, when the table shown in FIG. 9 is provided, the template generating unit 405 inserts a template row above the row 905 and inserts a template column to the left of the column 906. That is, the row 1010 and the column 1009 in FIG. 10 are inserted.
(Step 1305)

When such a template row and a template column are inserted into the table, the template generating unit 405 highlights the cell 1011 at the intersection of the template row and the template column. FIG. 14 shows an exemplary display thereof. A cell that is highlighted is a target cell into which information for creating RDF should be entered, and has an advantageous effect in that it can prompt a user to enter such information. Such highlight display can prevent the user from mistakenly selecting a cell into which information cannot be entered.
(Step 1306)

Next, the template generating unit 405 inserts one empty row immediately below the row of column headings (or, when there is a plurality of rows of column headings, immediately below each individual row of column headings) to prepare a row for entering dimension's value and measure. Such inserted row is referred to as a URI row. FIG. 15 shows an exemplary display in which there are two rows of column headings. At the same time, the template generating unit 405 highlights portions into which a user should enter information. Such highlight display can prevent the user from mistakenly selecting a cell into which information cannot be entered.

(Step 1307)

After that, the template generating unit 405 updates the value of the data start row DR. Specifically, the template generating unit 405 doubles the value of the start row DR set in step 1302.

(Step 1308)

Figure 16:
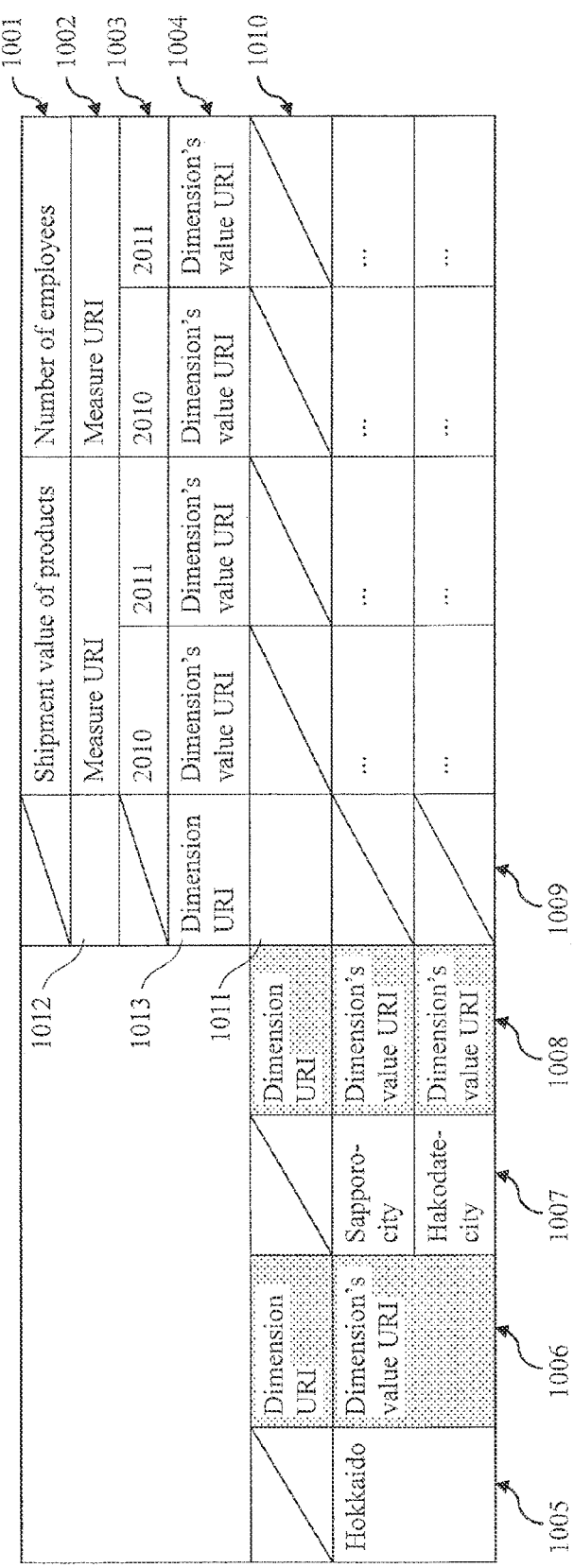
FIG. 16 is a diagram showing an exemplary screen in which a URI column, which has been inserted to the immediate right of each column of row headings, is highlighted.

Further, the template generating unit 405 inserts one column to the immediate right of the column of row headings (or, when there is a plurality of columns of row headings, such as column 1005 and column 1007 in FIG. 10, template generating unit 405 inserts one column, such as column 1006 and column 1008 in FIG. 10 to the immediate right of each individual column 1005 and column 1007 respectively) to prepare a row for entering dimension's value. At the same time, the template generating row 405 highlights portions into which a user should enter information. Such inserted column is referred to as a URI column. FIG. 16 shows an exemplary display in which there are two columns 1005 and 1007 of row headings. The highlight display in this case can also prevent the user from mistakenly selecting a cell into which information cannot be entered.

(Step 1309)

After that, the template generating unit 405 updates the value of the data start column DC. Specifically, the template generating unit 405 doubles the value of the start column DC set in step 1302.

(Conclusion)

The template table is generated thorough the aforementioned process. Then, a user enters information for creating RDF into the highlighted cells in the template table. The template generating unit 405 stores the entered information in association with each cell. It should be noted that when a history of data entered in the past, dictionary, and the like are available, the template generating unit 405 may adopt a mechanism of automatically entering information for creating RDF into a corresponding cell on the basis of information on the history, dictionary, and the like. When such automatic entering function is mounted, it becomes possible to reduce the burden on the user to enter information. Needless to say, both the following cases are conceivable: a case where not all pieces of information can be entered automatically and a case where automatically entered information contains errors. Thus, automatically entered information is desirably displayed in a display configuration that allows the user to check the entered information.

(4-2) Process of Operating Display Switch Button

Figure 17:
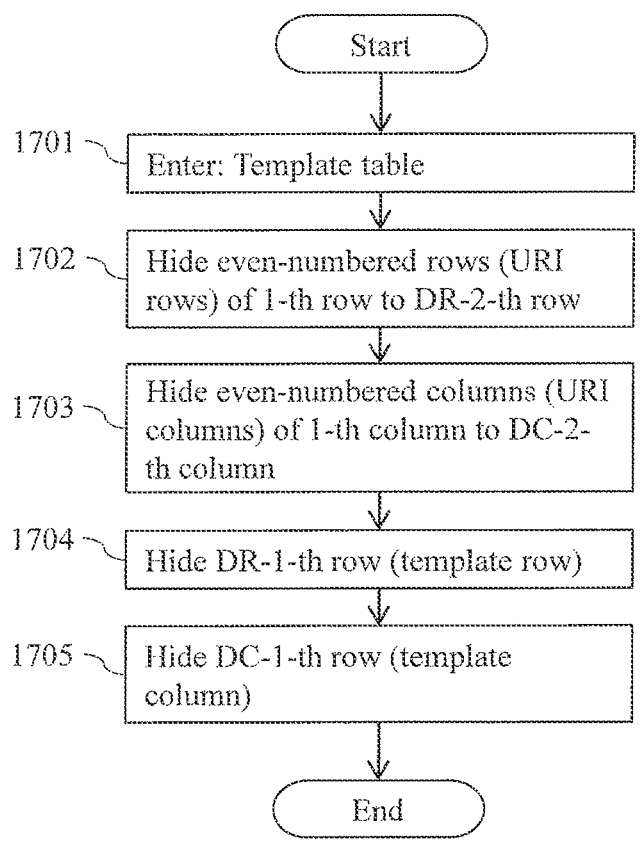
FIG. 17 is a flowchart illustrating a process of switching the display of a template table into a hidden state.

Next, a process that is executed when a user clicks the display switch button 1102 will be described. That is, a processing operation for switching the display state of a table displayed in the display area 1104 will be described. The display control unit 409, when the display switch button 1102 is clicked, determines if a template row/column and a URI row(s)/column(s) are already hidden. If the template row/column and the URI row(s)/column(s) are already hidden, the CPU 401 cancels the hiding setting. Meanwhile, if the template row/column and the URI row(s)/column(s) are not hidden, the display control unit 409 activates the hiding setting, and hides the target rows and columns in accordance with the processing procedures shown in FIG. 17. The process shown in FIG. 17 is executed by the display control unit 409 in accordance with a program.

(Step 1701)

Herein, a template table to be processed by the display control unit 409 is entered and displayed in the display area 1104.

(Step 1702)

The display control unit 409 hides the URI row(s) inserted immediately below the row(s) of column headings. Each of such URI rows is an even-numbered row. Thus, the display control unit 409 hides the even-numbered row(s) in the range of up to two rows smaller than the start row DR of the data portion.

(Step 1703)

Next, the display control unit 409 hides the URI column (s) inserted to the immediate right of the column(s) of row headings. Each of such URI columns is an even-numbered column. Thus, the display control unit 409 hides the even-numbered columns in the range of up to two columns smaller than the start column DR of the data portion.

(Steps 1704-1705)

Next, the display control unit 409 hides the template row and the template column. Specifically, the display control unit 409 hides a row that is one row smaller than the start row DR of the data portion and a column that is one column smaller than the start column DC of the data portion.

(Conclusion)

When a function of switching the display configuration displayed in the display area 1104 is mounted, a user is able to efficiently perform an editing operation. For example, when information for creating RDF is entered or when information that has been entered is checked, a template table that contains a template row/column and URI row(s)/column(s) are displayed on the screen. Meanwhile, when a user wants to check information described in a table, a table in a secondary format, which contains no template row/column or URI rows/columns, is displayed on the screen.

(4-3) Process of Inserting/Deleting Rows/Columns

A user is able to insert or delete rows and columns into/from a table (which includes not only the original table but also a template table) displayed in the display area 1104 as needed. It should be noted that the CPU 401 determines, before executing insertion/deletion of rows and columns, if the rows and columns are currently displayed on the screen. Hereinafter, a case where a template table is displayed in the display area 1104 will be described to simplify the description.

(Insertion of Rows/Columns)

Figure 18:
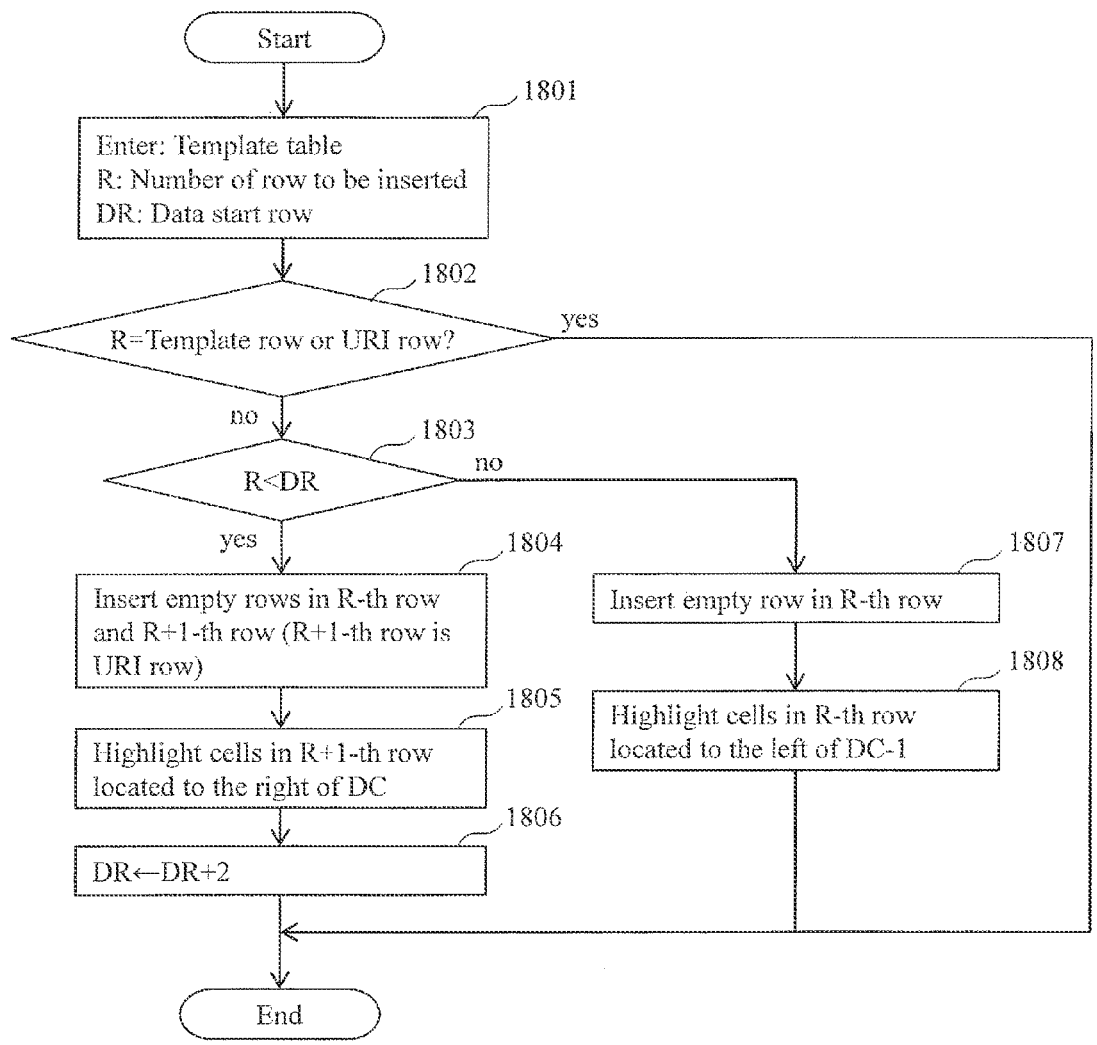
FIG. 18 is a flowchart illustrating a process of inserting a URI row into a template table.

First, processing procedures for inserting a new row into the existing template table will be described with reference to FIG. 18. It should be noted that processing procedures for inserting a new column into the existing template table are similar to those in FIG. 18. Thus, description thereof will be omitted.

(Step 1801)

The CPU 401 imports a template table to be edited, the number R of a row to be inserted, and the start row DR of the data portion. The value of the start row DR is already known at a point in time when the template table was generated by importing the original table.

(Step 1802)

Next, the CPU 401 determines if the row to be inserted corresponds to a template row or a URI row. It is impossible to insert rows at such locations. Thus, when a template row or a URI row is designated as the row to be inserted, the process is terminated as it is. Meanwhile, when the row to be inserted is neither a template row nor a URI row, the CPU 401 proceeds to step 1803.

(Step 1803)

The CPU 401 determines if the value of the location of the row to be inserted (i.e., the row number: R) is smaller than the data start row DR. That is, the CPU 401 determines if the row to be inserted belongs to the column heading portion or belongs to the data portion. If it is determined that the row is to be inserted into the column heading portion, the CPU 401 executes processes of step 1804 and the following steps. Meanwhile, if it is determined that the row is to be inserted into the data portion, the CPU 401 executes processes of step 1807 and the following steps.

(Step 1804)

Herein, the CPU 401 actually inserts the row into the template table. In this case, the inserted row is a row of column headings. Thus, a URI row (one row) is also concurrently inserted to allow entry of information for creating RDF. Such a function can avoid failures to enter information for creating RDF.

(Steps 1805 to 1806)

Next, the CPU 401 highlights a cell into which information for creating RDF should be entered. Such highlight display can prevent a user from mistakenly selecting a cell into which information cannot be entered. When predetermined information is entered into the highlighted cell, the entered information is held. Next, the CPU 401 updates the value of the start row DR of the data portion. Since two rows were added in step 1804 above, the value of the start row DR is updated to DR+2.

(Steps 1807 to 1808)

Meanwhile, if it is determined that the row is to be inserted into the data portion, a URI row need not be added unlike a case of inserting the row into the column heading portion. Thus, the CPU 401 inserts an empty row to at the designated row number R. Next, the CPU 401 highlights a cell, of the inserted row, located to the left of the start column DC of the data portion.

(Deletion of Row/Column)

Figure 19:
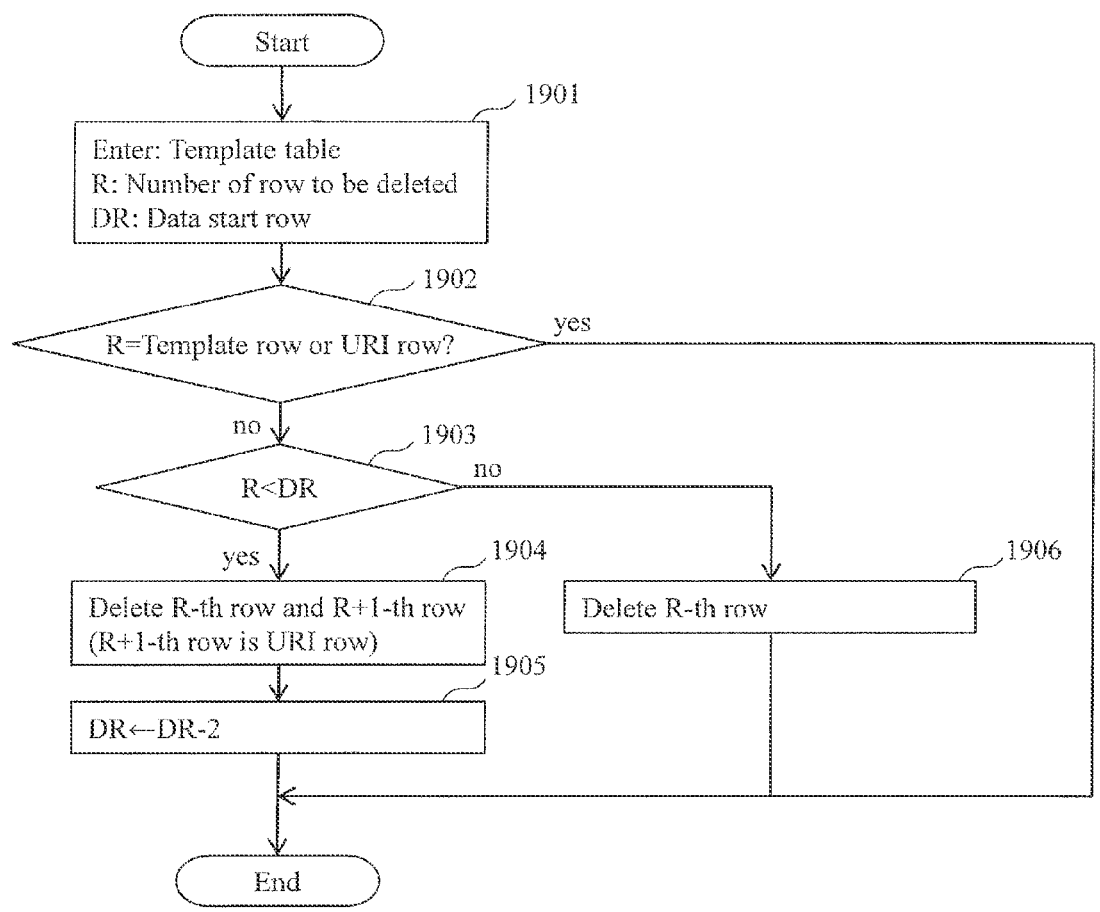
FIG. 19 is a flowchart illustrating a process of deleting a URI row from a template table.

Next, processing procedures for deleting a given row from the existing template table will be described with reference to FIG. 19. It should be noted that processing procedures for deleting a given column from the existing template table are similar to those in FIG. 19. Thus, description thereof will be omitted.

(Step 1901)

The CPU 401 imports a template table to be edited, the number R of a row to be deleted, and the start row DR of the data portion. The value of the start row DR is already known at a point in time when the template table was generated by importing the original table.

(Step 1902)

Next, the CPU 401 determines if the row to be deleted corresponds to a template row or a URI row. Such row is not allowed to be deleted. Thus, when a template row or a URI row is designated as the row to be deleted, the process is terminated as it is. Meanwhile, when the row to be deleted is neither a template row nor a URI row, the CPU 401 proceeds to step 1903.

(Step 1903)

The CPU 401 determines if the value of the location of the row to be deleted (i.e., the row number: R) is smaller than the data start row DR. That is, the CPU 401 determines if the row to be deleted belongs to the column heading portion or the data portion. When the row to be deleted is the row in the column heading portion, the CPU 401 executes processes of step 1904 and the following step.

(Steps 1904 to 1905)

Herein, the CPU 401 actually deletes the row from the template table. In such a case, the deleted row is a row of column headings. Thus, the URI row (one row) is also concurrently deleted. Such a function can eliminate a possibility that unnecessary data may remain in the template table. Next, the CPU 401 updates the value of the data start row DR to DR-2.

(Step 1906)

Meanwhile, when the row to be deleted is the row of the data portion, the CPU 401 deletes the designated row. As described above, in the case of this embodiment, unnecessary information of the row heading portion can be deleted at once. Meanwhile, in the method of managing information for creating RDF by defining it at a place other than a template table, it would be necessary to search for information for creating RDF and delete it. That is, it would be necessary to execute a process of searching for an element in each column of row headings corresponding to the row to be deleted and delete information for creating RDF of the corresponding element.

However, in the case of the template table proposed in this embodiment, the original table structure is held as it is. Thus, when a data row is deleted, information on the associated row heading portion can also be automatically deleted.

(4-4) Translation of Data in Table Format into Data into RDF Format

Figure 20:
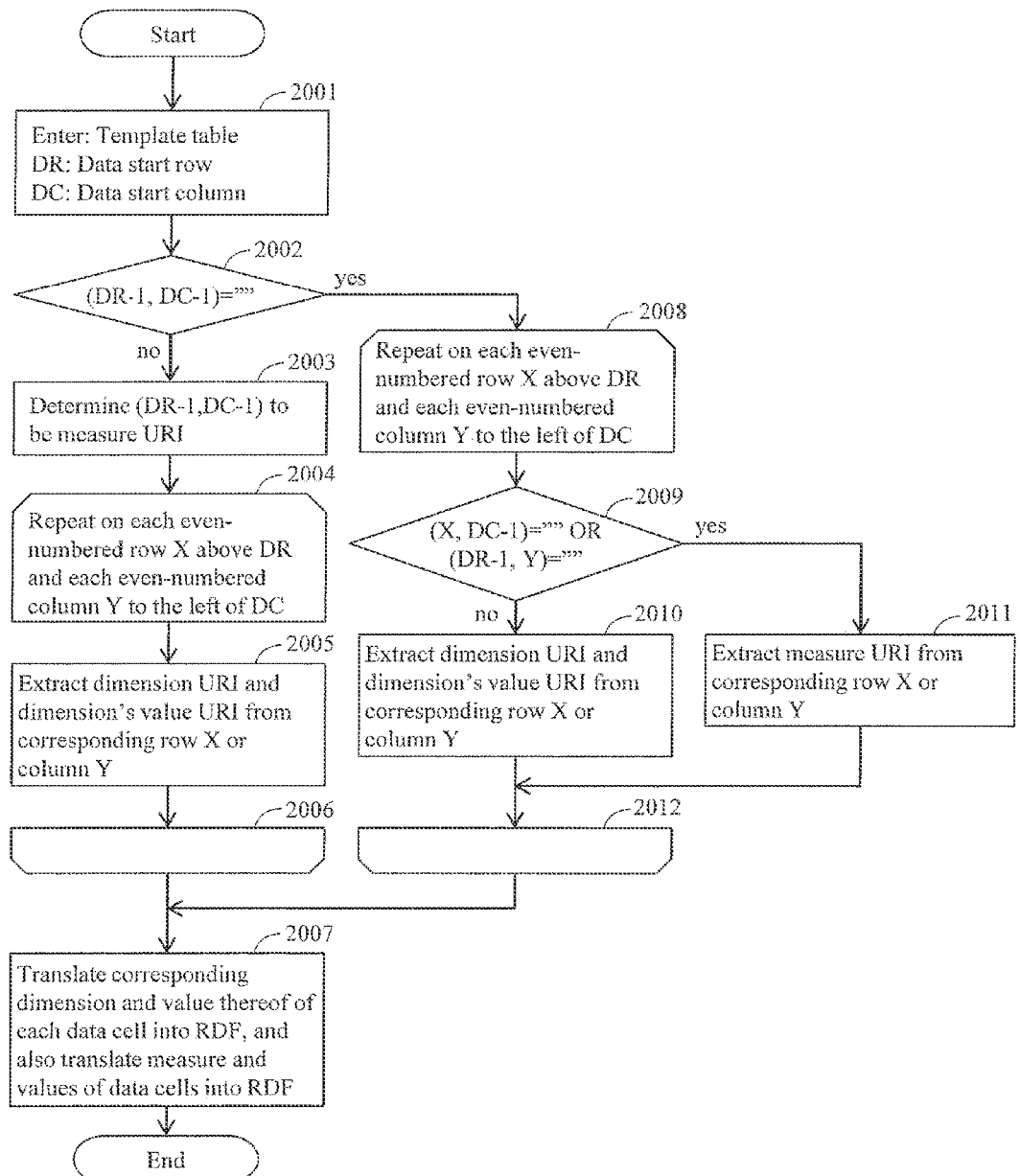
FIG. 20 is a flowchart illustrating a process of translating tabular data into RDF data.

Next, a process that is executed when a user clicks the translation button 1108 will be described. That is, a processing operation for when data in a table format that is displayed in the display area 1104 is translated into data in the RDF format and is displayed in the display area 1105 will be described. Herein, it is assumed as a precondition that even when an original table is displayed in the display area 1104, a corresponding template table is already generated. Hereinafter, processing procedures for translating data in a table format into data in the RDF format will be described with reference to FIG. 20.

(Step 2001)

First, the RDF translating unit 406 imports a template table to be translated and the start row DR and the start column DC of the data portion.

(Step 2002)

Next, the RDF translating unit 406 determines if there is a value at the intersection of a template row and a template column. Specifically, the RDF translating unit 406 determines if a cell at the coordinates (DR-1,DC-1) is empty (blank). For example, in the case of the template table shown in FIG. 8, if a cell denoted by reference numeral 801 is empty (blank) is determined, while in the case of the template table shown in FIG. 10, if a cell denoted by reference numeral 1011 is empty (blank) is determined.

A template table that has a value at a cell of the intersection is a "table of a single measure." The template table in FIG. 8 corresponds to this case. If the template table is determined to be a "table of a single measure," the RDF translating unit 406 proceeds to step 2003. Meanwhile, a template table that has no value at a cell of the intersection is a "table of a plurality of measures." The template table in FIG. 10 corresponds to this case. If the template table is determined to be a "table of a plurality of measures," the RDF translating unit 406 proceeds to step 2008.

(Step 2003)

The RDF translating unit 406 determines the value of the cell located at the intersection of the template row and the template column to be a measure URI. A measure that is identified by such measure URI is a measure of all pieces of data that are described in the data portion of the table.
(Steps 2004-2006)

Next, the RDF translating unit 406 extracts dimension URIs and dimension's value URIs from the URI row (each even-numbered row located above the start row DR of the data portion) and the URI column (each even-numbered column located to the left of the start column DC of the data portion). It should be noted that in the case of a table of a single measure, all pieces of information on the URI row and the URI column in the column heading portion and the row heading portion are necessarily information about dimensions. Therefore, the RDF translating unit 406 can extract dimension URIs and dimension's value URIs from the URI row and the URI column.
(Steps 2008-2012)

Next, a case where a positive result is obtained in step 2002 will be described. In this case, the cell at the intersection that represents an inspection target is empty. Thus, the table to be translated is a "table of a plurality of measures." For example, the template table shown in FIG. 10 corresponds to this case. In such a case, a plurality of measures is embedded in any of the rows of column headings or the columns of row headings.

Thus, the RDF translating unit 406 first executes a process of searching for a URI row or a URI column in which measures are embedded. In this case, the RDF translating unit 406 determines if a cell at the intersection of the URI row of the column heading portion (each even-numbered row located above the start row DR of the data portion) and the template column is empty (blank), or determines if a cell at the intersection of the URI column (each even-numbered column located to the left of the start column DC of the data portion) and the template row is empty (blank).

If measures are embedded, a cell at the intersection of a corresponding URI row and the template column or a cell at the intersection of a corresponding URI column and the template row should be empty (blank). Step 2009 corresponds to the determination of such condition. Thus, the RDF translating unit 406 extracts a set of measure URIs from the URI row or the URI column whose cell at the intersection is empty. Meanwhile, the RDF translating unit 406 extracts dimension URIs and dimension's value URIs from a URI row or a URI column whose cell at the intersection is not empty.
(Step 2007)

Through the aforementioned process, the URIs of "measures," "dimensions," and "values of a dimension" that correspond to a given data cell can be extracted. Thus, the RDF translating unit 406 translates data in given data cells into RDF using such information.

(4-5) Translation of Data in RDF Format into Data in Table Format

Finally, a process that is executed when a user clicks the translation button 1109 will be described. That is, processing operations for translating data in the RDF format, which is displayed in the display area 1105, into data in a table format and displaying the resultant data in the display area 1104 will be described. Hereinafter, processing procedures for translating data in the RDF format into data in a table format will be described with reference to FIG. 21.
(Step 2101)

First, the table translating unit 407 creates a set R by collecting three elements called a triple (s, p, o) from data in the RDF format that is displayed in the display area 1105.

The RDF format uses three elements (i.e., triple) including a subject s, a predicate, and an object to represent that the feature or the attribute of s is o. When the network representation in FIG. 3 is referred to, the subject corresponds to a node that is the source of a link, the predicate corresponds to the link, and the object corresponds to a node that is the destination of the link. The example in FIG. 3 includes three triples.
(Step 2102)

Next, the table translating unit 407, after extracting predicates p, which represent measures, from the set R of triples, sorts the predicates p in a given order to create a list PA. Hereinafter, an example in which data in the RDF format, which has been created by translating data in the table format shown in FIG. 9, is used as an input and such data is translated into data in the table format again will be described. In this case, the "shipment value of products" and the "number of employees" represent measures. Accordingly, a list PA for the [shipment value of products and number of employees] is created. Although the actual measures are represented by URIs, they are represented by character strings herein for the convenience of the description.
(Step 2103)

The table translating unit 407, after extracting predicates p, which represent dimensions, from the set R of triples, sorts the predicates p in a given order to create a dimension list PD. In the example shown herein, a dimension list PD for [prefecture, city, year] is created, for example.
(Step 2104)

The table translating unit 407, after extracting only subjects from the set R of triples, sorts the subjects in a given order to create a list S. The number of subjects correspond to the number of data cells. The table exemplarily shown in FIG. 9 contains eight data cells. Thus, the number of subjects is also eight.
(Step 2105)

The table translating unit 407 creates a list pv of dimension's values that has a length corresponding to the number of dimensions |PD| for each element of the list S. In the example herein, the dimension list PD has three elements. Thus, a list pv of dimension's values having a length of three is created. A corresponding value of a dimension is entered into each element of the list pv. For example, a list pv of dimension's values for the three rows×three columns of cells in FIG. 9 corresponding to [Hokkaido, Sapporo-city, 2010] is created. The number of the thus created lists pv of dimension's values is equal to the number of subjects s, and correspond one-to-one to the subjects.

Next, the table translating unit 407 creates a list PVU by performing multi column sorting on a set of the lists pv of dimension's values based on the N-th element of a list pv of dimension's values as a key. As mentioned above, the lists pv of dimension's values corresponds one-to-one to the subjects s. Therefore, when multi column sorting is performed on the lists pv of dimension's values, the subjects s are rearranged in conjunction therewith. Further, the table translating unit 407 obtains the list PVU by eliminating overlaps of elements in the sorted lists pv of dimension's value.

Figure 21:
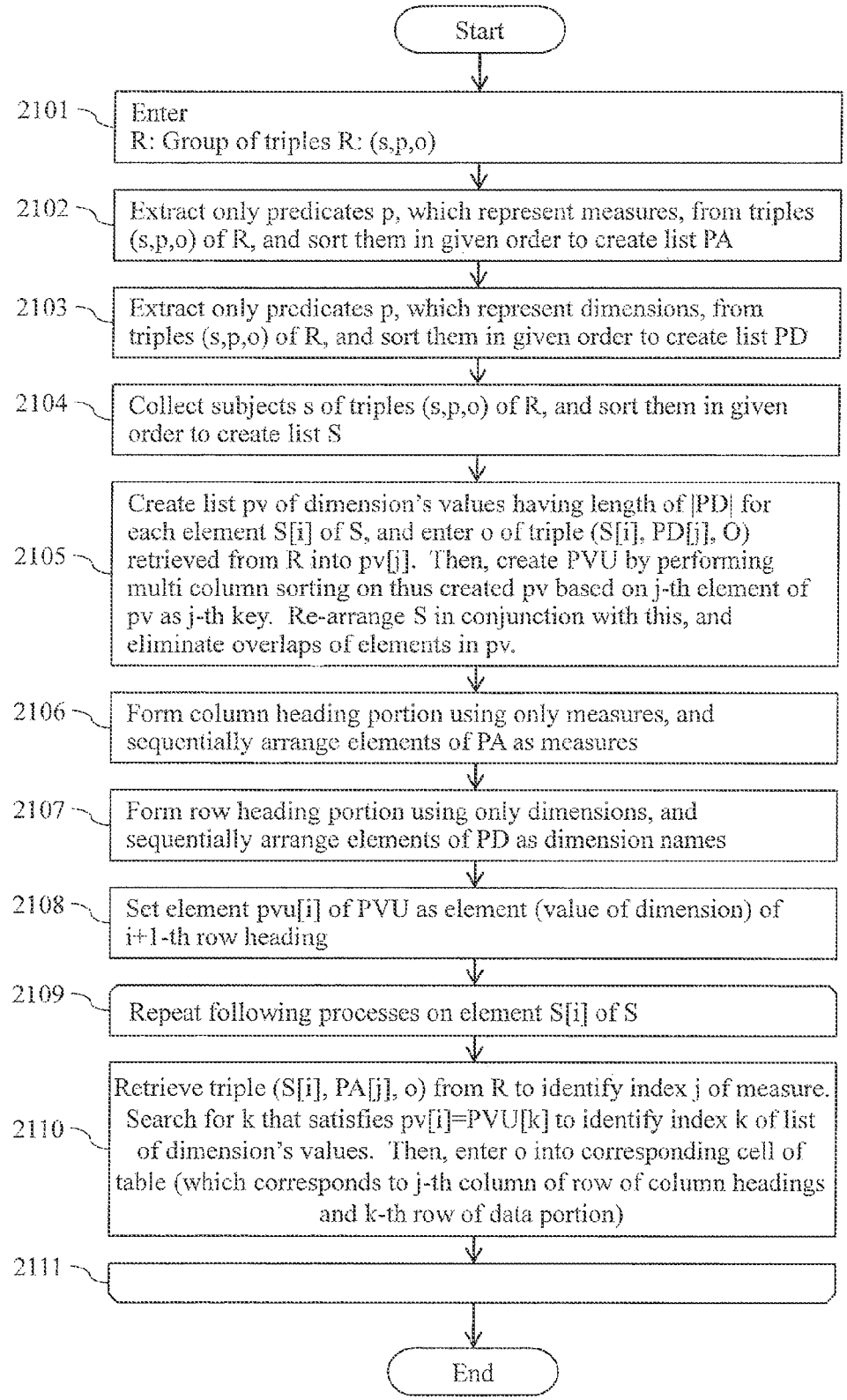
FIG. 21 is a flowchart illustrating a process of translating RDF data into tabular data.

Through the aforementioned processes, preparation for a translation process is complete. Then, the data is arranged in the table format. When there is a plurality of measures, the table translating unit 407 arranges only the measures in the column heading portion, and arranges all dimensions in the row heading portion. Meanwhile, when there is a single measure, the table translating unit 407 adequately divides dimensions, arranges one (some) of them in the column heading portion, and arranges the other dimension(s) in the row heading portion. Although FIG. 21 shows an example of processing procedures that are applied when there is a plurality of measures, it is also easily applicable to a case where there is a single measure.

(Steps 2106-2108)

First, the table translating unit 407 forms a column heading portion, and then forms a row heading portion in the following steps 2107 and 2108. Specifically, the table translating unit 407 sequentially arranges elements of the list PA as measures in the column heading portion, and sequentially arranges elements of the list PD as dimension names in the row heading portion. In this case, the i-th element of the list PVU is set as an element of a column of row-headings in the i+1-th row.

FIG. 22 shows an exemplary structure of the thus created table. Herein, not a template table but a table for humans are described to simplify the description. However, in practice, dimension URIs, dimension's value URIs, and measure URIs are arranged in a URI row(s) and a URI column(s) of the template table. It should be noted that the structure of the table created herein is only exemplary, and can typically have a plurality of structures.

As described in step 2106, elements of the list PA are arranged as they are as measures in the column heading portion. Meanwhile, elements of the list PVU are sequentially arranged as dimensions from the top in the row heading portion. FIG. 22 shows the arrangement relationship thereof.

(Step 2109 to Step 2111)

The structure of the table is determined as described above. The table translating unit 407 fills the data cells by determining to which data cell each element S[i] of the subject S corresponds. FIG. 23 shows a set of triples R each having the element S[1] as a subject. First, a triple whose subject is the element S[1] and whose predicate is a measure is retrieved. Such a triple can be uniquely determined as only one cell contains a measure. Herein, it is seen that a triple denoted by reference numeral 2301 is found, and the measure of the element S[1] is the "number of employees." The column number of the element S[1] is determined by searching the measure list PA. Next, the row number of the element S[i] is also determined by searching the list PVU for the dimension list [Hokkaido, Sapporo-city, 2011] of the element S[1].

Finally, the table translating unit 407 enters the object of a triple whose subject is the element S[i] and whose predicate is as an attribute, as the value of the data cell identified in the aforementioned process. When such a process is repeated for all elements of the subject S, all pieces of data can be arranged in the data cells of the table. Using the method described herein can create a table in a given data format, inclusive of a case where there is a plurality of dimensions and a plurality of measures.

(4-5) Conclusion

The aforementioned description is based on the premise that data in the RDF format is acquired from the secondary storage 411 or the network 420 through a click operation on the RDF import button 1103. However, it is also possible to adopt a method of acquiring data in the RDF format through search. Data in the RDF format can be flexibly retrieved when a query language called SPARQL (SPARQL Protocol and RDF Query Language) is used. For example, it is possible to retrieve the total number of patent applications of each prefecture and the sum total of the research investment expenses of each prefecture from different sources and integrate them.

However, as the search results are represented in the RDF format, they are not easy to view for humans. Thus, when search result data in the RDF format is imported into the display area 1105 and the translation button 1109 is clicked, the search result data is allowed to be viewed in a table format. Further, if necessary, it is also possible to modify data on the table and click the translation button 1108 to restore the data to the RDF format. As described previously, although it would be burdensome to edit data in the RDF format, this embodiment allows an operation of checking or editing data in the RDF format to efficiently advance by clicking the translation buttons 1108 and 1109.

(6) Advantageous Effects

A table format multi-dimensional data translation device in accordance with this embodiment creates, without making any changes to the data portion of an original table that has been entered, a template table (i.e., intermediate table) by embedding into the original table information that is necessary to translate the original table into data in the RDF format. Therefore, it is possible to translate each data of the data portion of the original table into data in the RDF format while always allowing the data to be viewed or edited on the original table.

In addition, in the case of this embodiment, all pieces of information that are necessary can be embedded into a table that is entered. Thus, data management is easy to perform. In addition, as the elements of column headings and row headings and URIs (IDs) associated therewith are displayed side by side, it is possible to avoid failures to enter URIs or avoid erroneous entry of URIs. Further, as a list of the associated URIs can be viewed on the screen, it is easy to maintain the coherence of the URIs.

(7) Other Embodiments

It should be noted that the present invention is not limited to the aforementioned embodiments, and includes a variety of variations. For example, although the aforementioned embodiments have been described in detail to clearly illustrate the present invention, the present invention need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add/remove/substitute a structure of another embodiment.

Some or all of the aforementioned structures, functions, processing units, processing means, and the like may be implemented as an integrated circuit or other hardware, for example. Alternatively, each of the aforementioned structures, functions, and the like may be implemented through analysis and execution of a program that implements each function by a processor. That is, each of the aforementioned structures, functions, and the like may also be implemented as software. Information such as the program that implements each function, tables, and files can be stored in a storage device such as memory, a hard disk, or a SSD (Solid State Drive); or a storage medium such as an IC card, an SD card, or a DVD.

In addition, the control lines and information lines represent those that are considered to be necessary for the description, and do not necessarily represent all control lines and information lines that are necessary for a product. Thus, in practice, almost all structures may be considered to be mutually connected.

DESCRIPTION OF SYMBOLS

400 Table format multi-dimensional data translation device
401 CPU
402 Memory
403 Keyboard/mouse
404 Display
405 Template generating unit
406 RDF translating unit
407 Table translating unit
408 Input/output control unit
409 Display control unit
410 Data communication unit
411 Secondary storage
420 Network

What is claimed is:

1. A table format multi-dimensional data translation device comprising:
a first processing unit configured to
insert, into an original table comprising a plurality of rows each comprising one or more cells and a plurality of columns each comprising one or more cells, a first row below each row of one or more rows of a column heading portion of the original table, each of the one or more rows of the column heading portion comprising one or more column headings each traversing one or more columns;
enter, into each cell of each inserted first row, an ID of a corresponding column heading of the one or more column headings of the column heading portion;
insert a first column to the right of each column of one or more columns of a row heading portion of the original table, each column of the row heading portion comprising one or more row headings each traversing one or more rows; and
enter, into each cell of each inserted first column, an ID of a corresponding row heading;
a second processing unit configured to:
insert a second row between the column heading portion and a data portion of the original table comprising a plurality of rows and columns,
insert a second column between the row heading portion and the data portion,
determine, for each of the one or more inserted first rows of the column heading portion, whether a corresponding first row indicates a value of a dimension;
determine, for each of the one or more inserted first columns of the column heading portion, whether a corresponding first column indicates a value of a dimension;
if it is determined that the corresponding first row of the column heading portion of the original table indicates a value of a dimension, enter an ID of the dimension of the corresponding first row into a cell at an intersection of the inserted second column and the corresponding first row and if it is determined that the corresponding first row of the column heading portion does not indicate a value of a dimension, do not enter the ID of the dimension of the corresponding first row into the cell at the intersection of the inserted second column and the corresponding first row;
if it is determined that the corresponding first column of the row heading portion indicates a value of a dimension, enter an ID of the dimension of the corresponding first column into a cell at an intersection of the inserted second row and the corresponding first column and if it is determined that the corresponding first column of the row heading portion does not indicate a value of a dimension, do not enter the ID of the dimension of the corresponding first column into the cell at the intersection of the inserted second row and the corresponding first column;
if it is determined that each of the one or more inserted first rows of the column heading portion indicate a value of a dimension and each of the one or more inserted first columns of the row heading portion indicate a value of a dimension, enter an ID of a measure into a cell at an intersection of the inserted second row and the inserted second column;
if it is determined that at least one of: (i) each of the one or more inserted first rows of the column heading portion do not indicate a value of a dimension and (ii) each of the one or more inserted first columns of the row heading portion do not indicate a value of a dimension, do not enter an ID of the measure into the cell at the intersection of the inserted second row and the inserted second column; and
a third processing unit configured to:
identify from each cell of a data portion of a template table created by the first and second processing units, template information including a corresponding dimension, a corresponding value of the corresponding dimension, and a corresponding measure entered in the cells of each of the one or more rows of the column heading portion and the cells of each of the one or more columns of the row heading portion; and
output the template information as data in a Resource Description Framework (RDF) format.

2. The table format multi-dimensional data translation device according to claim 1, further comprising a display control unit configured to display on a display screen a first display area for displaying the original table or the template table and a second display area for displaying the data in the RDF format.

3. The table format multi-dimensional data translation device according to claim 2, wherein the display control unit displays the first and second display areas side by side on the display screen.

4. The table format multi-dimensional data translation device according to claim 2, wherein the display control unit switchably displays one of the first display area or the second display area on the display screen.

5. The table format multi-dimensional data translation device according to claim 2, wherein the display control unit switchably displays one of the original table or the template table on the first display area.

6. The table format multi-dimensional data translation device according to claim 2, wherein the display control unit visually indicates one or more cells to which an ID of a corresponding column heading of the one or more column headings is to be entered and visually indicates one or more cells to which an ID of a corresponding row heading of the one or more row headings is to be entered.

7. The table format multi-dimensional data translation device according to claim 2, wherein the display control unit visually indicates one or more cells to which an ID of a dimension or an ID of a measure of a corresponding first column is to be entered and visually indicates one or more cells to which an ID of a dimension or an ID of a measure is to be entered.

8. The table format multi-dimensional data translation device according to claim 2, wherein the display control unit displays a button for translating the original table or the template table displayed in the first area into data in the RDF format.

9. The table format multi-dimensional data translation device according to claim 2, wherein the display control unit displays a button for translating the data in the RDF format displayed in the second area into the original table or the template table.

10. The table format multi-dimensional data translation device according to claim 9, further comprising:
a sixth processing unit configured to, when the button is operated, generate, for each of the one or more first rows and columns, the second row and the second column, a set of three elements, representing a measure or a dimension, from the data in the RDF format, including a subject, a predicate and an object;
a seventh processing unit configured to, extract predicates from the data, and after extracting the predicates representing a measure from a corresponding set, sort the predicates in a given order to generate a first list;
an eighth processing unit configured to, after extracting predicates representing a dimension from a corresponding set, sorts the predicates in a given order to generate a second list;
a ninth processing unit configured to, after extracting subjects from the corresponding set, sorts subjects in a given order to generate a third list;
a tenth processing unit configured to generate, for each element of the third list, a fourth list having a length corresponding to a number of dimensions;
an eleventh processing unit configured to generate a fifth list by performing multi column sorting on an i-th (where i is a natural number) element of the fourth list;
a twelfth processing unit configured to delete overlaps of elements in the fifth list;
a thirteenth processing unit configured to arrange each element of the first list as a corresponding measure in the column heading portion;
a fourteenth processing unit configured to arrange each element of the second list as a dimension name in the row heading portion;
a fifteenth processing unit configured to arrange a j-th (where j is a natural number) element of a sixth list as an element of a j+1-th row heading;
and
a sixteenth processing unit configured to perform a process of searching each element of the third list for the set to identify an index of the corresponding measure, a process of searching for an element of the sixth list that matches an element of the fifth list to identify an index of the dimension, and a process of arranging an object identified in the process of identifying the index of the corresponding measure in a cell that is given by the two identified indices.

11. A table format multi-dimensional data translation computer implemented method comprising:
generating a template table by:
inserting, into an original table comprising a plurality of rows each comprising one or more cells and a plurality of columns each comprising one or more cells, a first row below each row of one or more rows of a column heading portion of the original table, each of the one or more rows of the column heading portion comprising one or more column headings each traversing one or more columns;
entering, into each cell of each inserted first row, an ID of a corresponding column heading of the one or more column headings of the column heading portion;
inserting a first column to the right of each column of one or more columns of a row heading portion of the original table, each column of the row heading portion comprising one or more row headings each traversing one or more rows; and
entering, into each cell of each inserted first column, an ID of a corresponding row heading;
inserting a second row between the column heading portion and a data portion of the original table comprising a plurality of rows and columns,
inserting a second column between the row heading portion and the data portion,
determining, for each of the one or more inserted first rows of the column heading portion, whether a corresponding first row indicates a value of a dimension;
determining, for each of the one or more inserted first columns of the column heading portion, whether a corresponding first column indicates a value of a dimension;
if it is determined that the corresponding first row of the column heading portion of the original table indicates a value of a dimension, entering an ID of the dimension of the corresponding first row into a cell at an intersection of the inserted second column and the corresponding first row and if it is determined that the corresponding first row of the column heading portion does not indicate a value of a dimension, not entering any ID into the cell at the intersection of the inserted second column and the corresponding first row;
if it is determined that the corresponding first column of the row heading portion indicates a value of a dimension, entering an ID of the dimension of the corresponding first column into a cell at an intersection of the inserted second row and the corresponding first column and if it is determined that the corresponding first column of the row heading portion does not indicate a value of a dimension, not entering any ID into the cell at the intersection of the inserted second row and the corresponding first column;
if it is determined that each of the one or more inserted first rows of the column heading portion indicate a value of a dimension and each of the one or more inserted first columns of the row heading portion indicate a value of a dimension, entering an ID of a measure into a cell at an intersection of the inserted second row and the inserted second column;
if it is determined that at least one of: (i) each of the one or more inserted first rows of the column heading portion do not indicate a value of a dimension and (ii) each of the one or more inserted first columns of the row heading portion do not indicate a value of a dimension, not entering an ID of a measure into a cell at an intersection of the inserted second row and the inserted second column; and identifying, from each cell of a data portion of the generated template table, template information including a corresponding dimension, a corresponding value of the corresponding dimension, and a corresponding measure entered in the cells of each of the one or more rows of the column heading portion and the cells of each of the one or more columns of the row heading portion; and outputting the information as data in a RDF format.

12. The method according to claim 11, further comprising displaying on a display screen a first display area for displaying the original table or the template table and a second display area for displaying the data in the RDF format.

13. The method according to claim 12, wherein further comprising displaying the first and second display areas side by side on the display screen.

* * * * *